Figure 1:
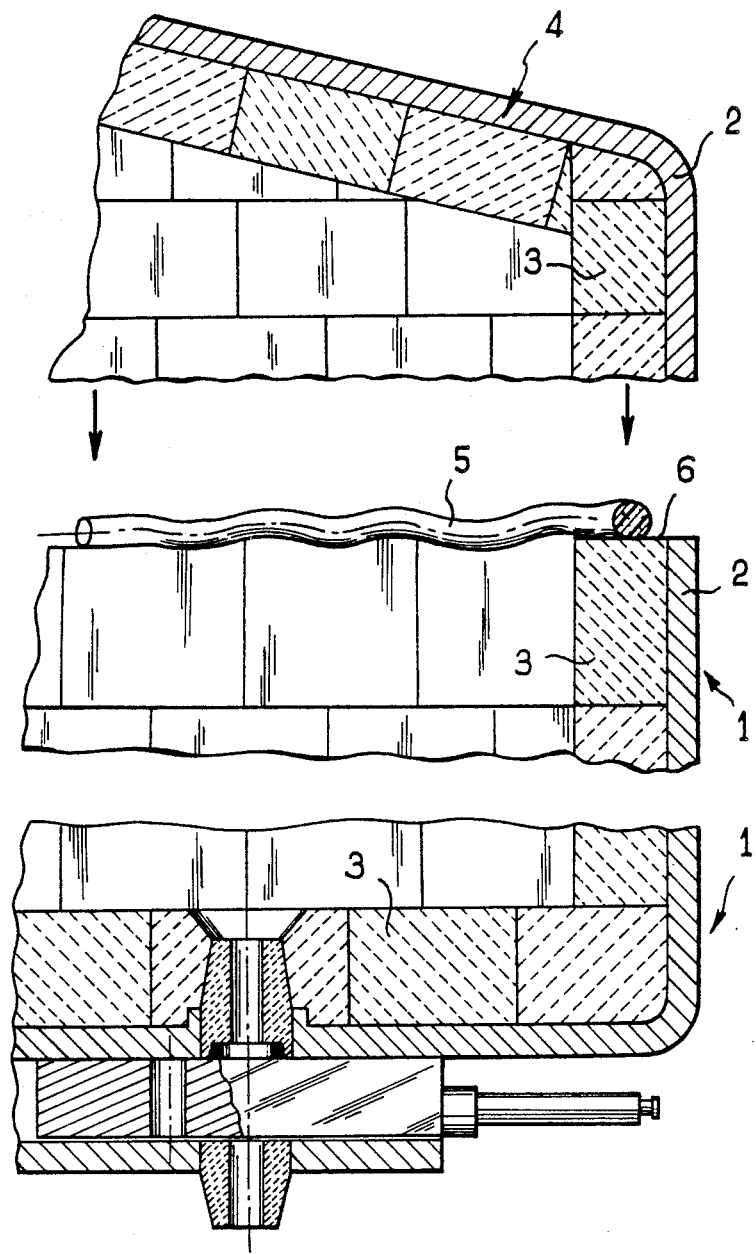

United States Patent [19]

Daussan et al.

[11] Patent Number: 4,939,033

[45] Date of Patent: Jul. 3, 1990

[54] PASTY GASKET FOR PRODUCING A LEAKPROOF SEAL BETWEEN SURFACES WHICH ARE SUBJECTED TO HEAT AND WHICH HAVE TO BE JOINED

[75] Inventors: Jean C. Daussan, Metz; Gérard Daussan; André Daussan, both of Longeville-les-Metz, all of France

[73] Assignee: Daussan et Compagnie, Woippy, France

[21] Appl. No.: 118,428

[22] Filed: Nov. 9, 1987

[30] Foreign Application Priority Data

Nov. 13, 1986 [FR] France .................... 86 15741

[51] Int. Cl.$^5$ ................. B32B 5/16
[52] U.S. Cl. ................. 428/331; 501/141; 277/DIG. 6; 106/DIG. 4
[58] Field of Search ............. 277/DIG. 6, 229; 106/85, DIG. 4; 501/141; 156/69; 266/275; 428/331

[56] References Cited

U.S. PATENT DOCUMENTS

| | | | |
|---|---|---|---|
| 4,042,229 | 8/1977 | Eccleston | 266/275 |
| 4,092,192 | 5/1978 | Magyari | 156/69 |
| 4,317,575 | 3/1982 | Cavicchio | 277/227 |
| 4,786,670 | 11/1988 | Tracy et al. | 524/34 |
| 4,799,652 | 1/1989 | Daussan et al. | 266/275 |

FOREIGN PATENT DOCUMENTS 1356382  6/1974 United Kingdom .

Primary Examiner—William R. Dixon, Jr.
Assistant Examiner—Deborah Jones
Attorney, Agent, or Firm—Young & Thompson

[57] ABSTRACT

A pasty gasket (5) is placed on the upper edge (6) of a metallurgical container (1) in order to produce a leakproof seal with the cover (4) of the latter. The gasket (5) is constituted by a mixture containing from 5 to 10% by weight of plasticizing substances containing clay and/or bentonite, 90 to 95% by weight of organic particles such as paper and/or inorganic such as carbon, carbide, borides, nitrides, silicides and sulfides, alone or in combination and/or anhydrous and/or hydrated refractory oxides such as silica, alumina, chromium-magnesium oxide, magnesium oxide, chamotte and mixtures thereof, the whole being given a pasty form by approximately 20 to 30% by weight of water relative to the weight of the dry constituents, the mixture of these constituents being produced shortly before application of the gasket. Use in order to produce a leakproof seal between the casting ladles, casting distributors and covers thereof, converters and their smoke- and dust-removing hoods and all surfaces which are subjected to heat and which have to be joined.

8 Claims, 2 Drawing Sheets

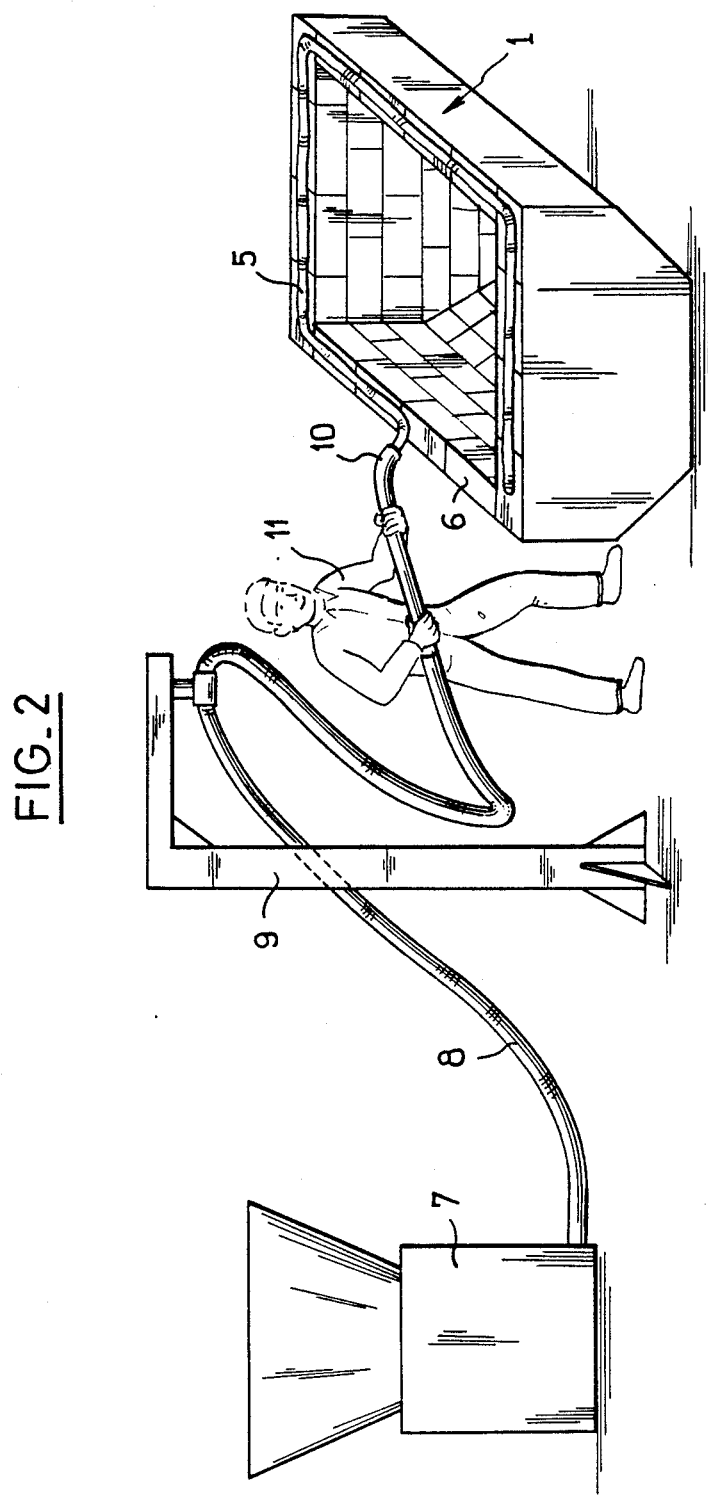

PASTY GASKET FOR PRODUCING A LEAKPROOF SEAL BETWEEN SURFACES WHICH ARE SUBJECTED TO HEAT AND WHICH HAVE TO BE JOINED

The present invention relates mainly to a pasty gasket intended to be placed on the upper edge of a metallurgical container and/or on the lower edge of its cover in order to produce a leakproof seal between the container and its cover.

It can also be placed on all types of sheet metal, for example between a converter and its suction hood in order to ensure the leakproof seal thereof to gases and to smoke.

Many metallurgical containers such as casting ladles, converters and lundishes are equipped with a cover to prevent oxidation of the liquid metal contained in these containers.

In particular, when it is desired to produce a special, very high quality steel, a vacuum casting is performed in order to avoid any risk of contact between the liquid metal and the ambient air.

In order to produce a vacuum above the liquid metal contained in a metallurgical container it is, of course, necessary to produce a highly leakproof connection between the upper edge of the metallurgical container and the cover of the latter.

Metallurgical containers are generally lined inside with a lining of refractory bricks joined using a refractory cement and/or a monolithic refractory lining.

The upper face of this lining of refractory bricks adjacent to the upper edge of the metallurgical container is very often nonuniform. This nonuniformity becomes accentuated over the course of time, bearing in mind the wear on the upper face of these refractory bricks, such that the latter make it impossible to obtain a leakproof connection with the cover.

To this end, it is possible to envisage the application on the upper edge of the metallurgical container of a coating of refractory material, such as a refractory cement. However, coatings of this type harden very rapidly particularly when heated. Therefore, given that several hours may elapse between the time when the coating is applied and the moment when the cover is applied on the container, the coating runs the risk of already having hardened when the cover is placed on it so that the leakproof seal can no longer be produced in this case.

Moreover, because such a coating hardens, it forms a solid connection between the upper edge of the container and the cover which is then difficult to remove when it is desired to reopen the cover.

The object of the present invention is to remedy this disadvantage by creating a pasty gasket which enables a perfect leakproof seal to be produced between the upper edge of a metallurgical container and its cover, this gasket being easy to apply, low in cost, sufficiently resistant, and capable of being easily removed at the end of casting.

According to the invention, this pasty gasket is constituted by a homogenous pasty mixture containing 0.5 to 20% by weight of plasticizing substances containing in particular clay and/or bentonite and 80 to 99.5% by weight of organic and/or inorganic particles, as well as 20 to 30% by weight of water relative to the weight of the dry constituents, the mixture of these constituents being produced shortly before application of the gasket.

Amongst inorganic plasticizing agents, there will be mentioned, for example, metal clays, bentonites, powdered graphite and alkali metal polyphosphates.

Amongst organic plasticizing agents, there will be mentioned for example polysacharides, natural and/or synthetic resins, oils and tars, kerosene and cellulose compounds such as: Blanose, carboxymethyl cellulose or any other surface-active compounds such as, for example, lignosulfonates.

The clay and/or the bentonite in particular contained in the gasket give the latter, in the presence of water, the consistency and the viscosity required in order to obtain satisfactory conditions for application of this composition.

The gasket produced in this way remains pasty while the water contained in the composition has not evaporated under the effect of the heat released by the liquid metal contained in the metallurgical container.

It has been observed that such a gasket remains pasty for several hours, even when it is exposed to a temperature greater than 100° C. which corresponds to that measured on the upper edge of a metallurgical container filled with liquid steel at about 1,600° C.

Therefore, the gasket according to the invention remains pasty and retains its consistency on the upper edge of the metallurgical container for several hours in such a manner that when the cover is applied on the gasket, the latter, by being squashed down on the upper edge of the metallurgical container, guarantees an excellent leakproof seal.

This leakproof seal is maintained while the gasket remains plastic, i.e. while the clay contains water. At the end of casting, and when the clay in the gasket has completely hardened and when all its water has evaporated under the effect of heat, the gasket becomes powdery and no longer guarantees any mechanical connection with the cover. Consequently, it is then very easy to remove this cover.

Other special features and advantages of the invention will become apparent in the following description.

In the attached drawings, given by way of example and not intended to be limiting in any way:

FIG. 1 is a view in partial longitudinal section, with sections removed, of a casting ladle the upper edge of which is equipped with a pasty gasket according to the invention, FIG. 2 is a diagrammatic view illustrating the process according to the invention.

In the embodiment in FIG. 1, there is shown a casting ladle 1 having an outer metal casing 2 which is lined internally by refractory bricks 3. This casting ladle 1 comprises a cover 4 the wall of which can have the same structure as that of the actual casting ladle.

According to the invention, the pasty gasket 5 which is placed on the irregular upper edge 6 of refractory bricks of the casting ladle 1 in order to produce the leakproof seal with the cover 4 is constituted by a homogenous pasty mixture containing 0.5 to 20% by weight of plastifying substances containing in particular clay and/or bentonite, and 80 to 99.5% by weight of organic and/or inorganic particles, as well as 20 to 30% by weight of water relative to the weight of the dry constituents. These constituents are mixed shortly before application of the gasket 5 on the upper edge 6 of the casting ladle.

The gasket 5 applied to the upper edge 6 of the casting ladle is, in the example shown, constituted by a preformed, single piece extruded strip.

The clay contained in the gasket 5 is preferably bentonite.

The inorganic particles contained in the gasket 5 are chosen for example from the group of hydrated and/or anhydrous refractory oxides including in particular silica, alumina, chromium-magnesium oxide, magnesium oxide, chamotte and a mixture of these compounds. Obviously, other inorganic particles may be present in the composition such as those of carbon, carbide, borides, nitrides, silicides, sulfides, alone or in combination.

The gasket 5 preferably contains between 5 and 10% by weight of bentonite. These proportions enable the gasket 5 to have the pasty consistency which is ideal in view of its application.

The gasket 5 advantageously contains up to 3% by weight of a surface active substance such as, for example, sodium lignosulfonate. The presence of this compound in the composition modifies the reology of the mixture and facilitates application of the cord.

The composition of the gasket 5 also preferably contains up to 10% by weight of organic and/or inorganic fibers such as paper wadding and/or mineral wool and/or slag and/or glass and/or ceramics wool in order to increase the mechanical strength of the pasty gasket.

By way of nonlimiting example, there is given below the composition by weight of a pasty gasket according to the invention:

bentonite: 7%
Siliceous sand: fineness index 100 (ASTM): 30%
Silica: specific surface 2,450 $m^2/g$: 60%
Paper wadding: 2.4%
Sodium lignosulfonate: 0.6%
Water: 25% of the weight of the dry constituents
Relative density in the wet pasty state: 1.62
Relative density in the dry powder state: 0.8

In order to prepare and apply the pasty gasket 5 on the upper edge 6 of the casting ladle in the form of an extruded strip, the following operation is performed:

The solid constituents of the gasket 5 are mixed with water in the apparatus 7 (see FIG. 2) so as to obtain a homogenous paste. Using a pump and/or a screw which is part of the apparatus 7, this paste is forced under pressure into a flexible hose 8 suspended from a support 9 in order to extrude at the outlet of this hose, wh'ich has a nozzle 10 held by a robot and/or a pointer 11, a continuous pasty strip 5 which is applied in a continuous manner on the upper edge 6 of the casting ladle.

The constituents of the gasket 5 are chosen so as to obtain a strip that is sufficiently pasty and strong so that the latter may be extruded at the outlet of the nozzle 10 in a continuous manner. Consequently, the application of the gasket 5 on the upper edge 6 of the casting ladle is a very simple operation which may be performed at a certain distance from the casting ladle 1 so that the robot and/or the pointer 11 does not risk being burnt by the heat released by the liquid metal contained in the casting ladle 1.

Given that the gasket 5 remains pasty for several hours, it can be applied to the upper edge 6 of the casting ladle before the liquid metal is introduced inside this ladle.

When the cover 4 is applied on the gasket 5, the gasket is squashed such that all nonuniformities in the casting ladle and its cover are matched. An excellent leakproof seal is thereby obtained between the upper edge 6 of the casting ladle and the adjacent edge of the cover 4.

This leakproof seal is maintained for several hours, i.e. during the entire residence of the liquid metal inside the casting ladle 1.

More precisely, the gasket 5 remains pasty whilst the bentonite that it contains retains water. The length of time necessary for evaporation of all the water retained by the bentonite depends on the total quantity of bentonite contained in the gasket, i.e. on the proportion of bentonite and on the thickness of the gasket.

The optimum thickness of the gasket 5 is of the order of 5 to 15 cm.

The ideal bentonite content is between 5 and 10% by weight. However, this content may vary between 0.5 and 20%. Above this limit of 20%, the paste of the gasket 5 is too adhesive and is no longer easy to extrude via the flexible hose 8.

Below 0.5% the bentonite no longer guarantees sufficient cohesion of the gasket.

After some hours, i.e. at the end of casting, the gasket 5 is completely dry and becomes powdery. The cover 4 may then be easily removed, given that the gasket 5 no longer adheres either to the edge 6 of the casting ladle or to the edge of the cover 4.

Similarly, given that the gasket 5 has become powdery, it is easy to remove and to replace it with a new pasty gasket for another casting operation.

The qualities of the gasket 5 may be improved by partially or totally substituting the refractory charge by inorganic compounds containing water of crystallization such as calcium and/or aluminum hydroxides or any other compounds containing water of crystallization.

These hydroxides have the property of crystallizing with a large number of molecules of water of crystallization.

When the gasket 5 is exposed to the heat of the liquid metal contained in the metallurgical container, the water of crystallization of the abovementioned compounds is removed at high temperature, forming a temperature plateau which delays the rise in temperature of the gasket. Consequently, the presence of these compounds with molecules of water of crystallization delays the rise in temperature of the gasket so that the plasticity of the bentonite is extended.

In this connection, it is advantageous to use several compounds with molecules of water of crystallization having release stages for these water molecules at different temperatures. Consequently, it is possible to control very precisely the rise in temperature and the plasticity of the gasket 5.

We claim:

1. Pasty gasket (5) adapted to be squashed between two surfaces which are subjected to heat and which have to be joined so as to be leakproof to gas, wherein this gasket (5) is constituted by a homogenous pasty mixture containing by weight as plasticizing substance 5 to 10% of at least one element from the group formed by clay and bentonite, and 90 to 95% of inorganic refractory particles and 20 to 30% by weight of water relative to the weight of the dry constituents, the mixture of these constituents being produced shortly before application of the gasket.

2. Pasty gasket as claimed in claim 1, wherein it is constituted by a preformed single piece extruded strip.

3. Pasty gasket as claimed in claim 1, wherein the inorganic particles are chosen from the group including silica, alumina, chromium-magnesium oxide, magnesium oxide, chamotte and a mixture of these compounds.

4. Pasty gasket as claimed in claim 1, which also contains up to 3% by weight of lignosulfonate as a surface-active agent.

5. Pasty gasket as claimed in claim 1, which also contains up to 10% by weight of organic and/or inorganic fibers.

6. Pasty gasket as claimed in claim 1, which contains 90 to 95% of inorganic particles and hydrated and/or anhydrous refractory oxides.

7. Pasty gaskets as claimed in claim 6, which contains several different compounds containing molecules of water of crystallization, the temperatures of release of these molecules being different.

8. Pasty gasket as claimed in claim 7, wherein the compounds containing molecules of water of crystallization are metal hydroxides.

* * * * *